(12) United States Patent
Finkenzeller et al.

(10) Patent No.: US 8,594,567 B2
(45) Date of Patent: Nov. 26, 2013

(54) CONTROLLED WIRELESS CHARGING OF AN ACCUMULATOR IN A CHIPCARD

(75) Inventors: Klaus Finkenzeller, Unterföhring (DE); Werner Ness, Unterschleissheim (DE)

(73) Assignee: Giesecke & Devrient GmbH, Munich (DE)

( * ) Notice: Subject to any disclaimer, the term of this patent is extended or adjusted under 35 U.S.C. 154(b) by 1455 days.

(21) Appl. No.: 11/660,451

(22) PCT Filed: Aug. 11, 2005

(86) PCT No.: PCT/EP2005/008757
§ 371 (c)(1),
(2), (4) Date: Oct. 1, 2007

(87) PCT Pub. No.: WO2006/018231
PCT Pub. Date: Feb. 23, 2006

(65) Prior Publication Data
US 2008/0296978 A1    Dec. 4, 2008

(30) Foreign Application Priority Data

Aug. 16, 2004 (DE) .......................... 10 2004 039 649
Aug. 16, 2004 (DE) .......................... 10 2004 039 651

(51) Int. Cl.
*H04B 7/00* (2006.01)
(52) U.S. Cl.
USPC ........................................ 455/41.2; 307/104
(58) Field of Classification Search
USPC .......................................... 455/41.2; 307/104
See application file for complete search history.

(56) References Cited

U.S. PATENT DOCUMENTS

| | | | |
|---|---|---|---|
| 3,493,838 A * | 2/1970 | Gyngyi et al. | 363/10 |
| 4,384,288 A | 5/1983 | Walton | |
| 4,538,220 A * | 8/1985 | Gyugyi | 363/161 |
| 5,449,894 A * | 9/1995 | Bruhnke et al. | 235/492 |
| 5,451,763 A * | 9/1995 | Pickett et al. | 235/492 |
| 5,504,785 A * | 4/1996 | Becker et al. | 375/344 |
| 5,552,641 A | 9/1996 | Fischer et al. | |
| 5,569,993 A | 10/1996 | Keith | |
| 5,905,372 A * | 5/1999 | Kuffner et al. | 323/356 |
| 5,963,012 A * | 10/1999 | Garcia et al. | 320/106 |
| 6,137,261 A | 10/2000 | Kurie et al. | |
| 6,173,899 B1 | 1/2001 | Rozin | |
| 6,194,993 B1 | 2/2001 | Hayashi et al. | |

(Continued)

FOREIGN PATENT DOCUMENTS

| | | |
|---|---|---|
| CA | 2 275 041 A1 | 12/2000 |
| DE | 100 28 839 A1 | 5/2001 |

(Continued)

*Primary Examiner* — Nay A Maung
*Assistant Examiner* — Erica Fleming-Hall
(74) *Attorney, Agent, or Firm* — Workman Nydegger (57) ABSTRACT

Method, apparatus and system for contactless charging of an energy storage unit of an energy sink (2) by an energy source (1). Data are transferred between the energy source and the energy sink via an alternating field in a first operating mode of the energy source. In a second operating mode of the energy source, an energy necessary for charging is transferred from the energy source to the energy sink via the alternating field. In the second operating mode, no data are transferred from the energy source to the energy sink and the alternating field is therefore produced with a field strength that is greater than a possible field strength upon simultaneous transfer of data and charging energy.

23 Claims, 6 Drawing Sheets

(56) References Cited

U.S. PATENT DOCUMENTS

| | | |
|---|---|---|
| 6,275,681 B1 | 8/2001 | Vega et al. |
| 6,362,738 B1 * | 3/2002 | Vega .................. 340/572.1 |
| 6,411,212 B1 | 6/2002 | Hecht et al. |
| 6,463,264 B1 | 10/2002 | Obara |
| 6,756,765 B2 | 6/2004 | Bruning |
| 6,944,424 B2 | 9/2005 | Heinrich et al. |
| 7,064,552 B2 | 6/2006 | Cuylen |
| 7,150,407 B1 | 12/2006 | Berger et al. |
| 7,375,492 B2 * | 5/2008 | Calhoon et al. ............ 320/108 |
| 2002/0087436 A1 * | 7/2002 | Guthrie et al. ............... 705/28 |
| 2003/0102960 A1 * | 6/2003 | Beigel et al. ............. 340/10.1 |
| 2003/0178967 A1 | 9/2003 | Khatri |
| 2003/0214399 A1 * | 11/2003 | Naruse et al. ............. 340/531 |
| 2004/0077313 A1 * | 4/2004 | Oba et al. ................ 455/41.2 |
| 2004/0116074 A1 * | 6/2004 | Fujii et al. ............... 455/41.2 |
| 2005/0001609 A1 | 1/2005 | Cuylen |
| 2005/0068019 A1 | 3/2005 | Nakamura et al. |
| 2005/0109841 A1 * | 5/2005 | Ryan et al. ................ 235/380 |
| 2005/0127867 A1 * | 6/2005 | Calhoon et al. ............ 320/108 |
| 2006/0002155 A1 * | 1/2006 | Shteynberg et al. ....... 363/21.12 |
| 2006/0205381 A1 | 9/2006 | Beart et al. |
| 2008/0272889 A1 * | 11/2008 | Symons .................... 340/10.1 |
| 2008/0284666 A1 * | 11/2008 | Hilgers ..................... 343/735 |

FOREIGN PATENT DOCUMENTS

| | | |
|---|---|---|
| DE | 10008600 | 9/2001 |
| EP | 0 886 232 A2 | 12/1998 |
| EP | 0 968 506 B1 | 9/2006 |
| WO | WO 99/43096 | 8/1999 |
| WO | WO 01/15061 A2 | 3/2001 |
| WO | WO 01/75787 A1 | 10/2001 |
| WO | WO 03/010711 A1 | 2/2003 |
| WO | WO 03/091943 A1 | 11/2003 |
| WO | WO 03/105311 A1 | 12/2003 |
| WO | WO 2004/055654 A2 | 7/2004 |

* cited by examiner

CONTROLLED WIRELESS CHARGING OF AN ACCUMULATOR IN A CHIPCARD

FIELD OF THE INVENTION

The present invention relates to a method, apparatus and system for charging an accumulator of a device, in particular to contactless charging for an accumulator in a portable data carrier.

BACKGROUND

Portable data carriers, such as chip cards or transponders, are hitherto dependent mainly on an external power supply. For supplying power to a batteryless transponder, a high-frequency magnetic alternating field of an RFID reading device (typical frequencies: 125 kHz, 13.56 MHz) is normally used. For this purpose, an alternating voltage induced by the magnetic alternating field in the antenna coil of the transponder is rectified and supplied to the transponder as supply voltage. For voltage regulation in the transponder, so-called shunt regulators are used. Surplus energy is thereby conducted into a shunt resistor and converted into heat.

To permit operation of a portable data carrier independently of an external power supply, portable data carriers can be provided with a battery. In particular for transponders or contactless chip cards, it should also be possible to charge the battery by a charging apparatus contactlessly, that is, not by a corresponding electroconductive contacting.

For contactless charging apparatuses, it is known to use the energy transferred through a close magnetic coupling (coils with a ferrite core) for charging an accumulator. Such an arrangement is for example used frequently in electrical tooth cleaning apparatuses to permit the handset to be supplied with power for charging the accumulator without an external galvanic contact.

The prior art comprises methods for data transfer at close range, such as NFC (near field communication). NFC is a transfer method by means of magnetic fields in the frequency domain of 13.56 MHz. The typical range of NFC devices is about 20 cm. The methods used for data transfer are very similar to those of contactless chip cards. NFC devices also therefore are able to communicate with contactless chip cards, or to simulate a contactless chip card (producing a load modulation). The NFC specification provides for not only a "peer-to-peer" mode, in which both communication partners transmit alternately, but also a mode in which a first NFC device changes to a permanent transmit mode ("being reader") and a second NFC device simulates a contactless chip card ("being card") to be able to communicate with the first device by load modulation in this way. For the field strengths of a carrier signal and of the corresponding sidebands of an NFC device, limiting values are defined which the radiated energy of the NFC device must not exceed. The field strength of a field usable for energy transfer is thus also limited.

To obtain an improved inductive coupling between a chip card with an antenna coil and a charging apparatus, DE 199 40 561 C1 uses as a charging apparatus a pin with a ferrite core and a transmitting coil. For energy transfer, the pin is inserted into a hole which is disposed in the chip card in the area of the antenna coil.

The U.S. Pat. No. 6,275,681 B1 shows a method for contactless charging of the power supply unit of a chip card by means of an electrostatic charging apparatus of a chip card reading device. The chip card comprises a control unit which controls the charging of the power supply unit in dependence on its state of charge, provided a sufficient voltage supply is available. The information on whether charging has been carried out completely or incompletely can be transferred from the chip card to the reading device and displayed to a user of the chip card.

The time duration of a process is particularly critical with contactless processes in comparison with contact-type processes. A user will for example consciously not hold his chip card in the area of a reading device for an indefinitely long time, or with increased probability unconsciously remove it from the communication area of the reading device.

SUMMARY

It is therefore the problem of the present invention to provide a method, system and apparatus for faster contactless charging of an energy storage unit in a device.

This problem is solved by the subject matter of the independent claims. Dependent claims are directed to preferred embodiments of the invention.

According to one approach of the present invention, it is provided to stop data transfer from an energy source to the device to be charged during the charging process. Since the transmitter is no longer modulated, no pronounced sidebands arise and the transmit power of the carrier signal can be adjusted to a higher value than would be possible with parallel data transfer. The higher field strength allows faster contactless charging of an accumulator in the device to be charged.

In an advantageous embodiment of the method, the energy source receives a request to terminate charging from the energy sink in the second operating mode. Alternatively or additionally, the energy source receives presence information from the energy sink, preferably at regular time intervals. In this way it is possible to avoid the energy source providing a field adapted for charging for an unnecessarily long time.

In a particularly advantageous embodiment, the energy source changes from an operating mode with higher transmit power to an operating mode with lower transmit power in order to check whether charging is to be continued in the operating mode with higher transmit power. It can thus be checked for example whether a device not involved in the charging process is present in the transmission range of the energy source and possibly a communication with such a third device is set up.

To control the transmit power of the energy source in a suitable way, it is expedient to use a plurality of operating modes with corresponding different transmit power stages in the energy source.

In a strict communication mode, the transmit power is selected so that bidirectional data transfer is possible without using an unnecessary high transmit power. The transmit power can for example be lowered continuously as far as possible in this mode. In a combined communication and charging mode, in contrast, the transmit power is set as high as is possible while complying with the given limits.

For a combined reception and charging mode, the transmit power can be selected higher than the given limit, since no data are sent to the energy sink. In particular, said transmit power can be increased gradually so far that it is still possible to receive data from the energy sink. In a strict charging mode, in contrast, the transmit power is selected so high that no communication is possible any longer between energy source and energy sink.

Such embodiments of the method or an accordingly adapted energy source permit an optimized adaptation of the transmit power of the energy source to the situational requirements.

In comparison with contact-type processes, the time duration of the process is particularly critical with contactless processes. A user will for example consciously not hold his chip card in the area of a reading device for an indefinitely long time or with increased probability unconsciously remove it from the communication area of the reading device.

It is a further approach of the present invention to initiate a charging process between an energy source and an energy sink only after the end of a predetermined minimal dwell time of the energy sink in the alternating field of the energy source. In a corresponding method, in a system for contactless charging of an energy storage unit of a portable data carrier by an energy source, data are transmitted between the energy source and the portable data carrier via an alternating field. The energy necessary for charging is transferred from the energy source to the portable data carrier via the alternating field. Only after the end of a predetermined minimal dwell time of the portable data carrier in the alternating field, the energy source switches to an operating mode for the step of energy transfer. This solution approach can be used as an alternative or in addition to the first-stated solution approach.

For energy sinks that are brought into the field of the reading device for the purpose of charging the charging process is thus prolonged by this predetermined time period, but for a large number of potential energy sinks an unnecessary switch to a charging mode is avoided. Unnecessary energy consumption in the energy source is thus prevented.

It is particularly advantageous to measure the predetermined minimal dwell time of the portable data carrier only after a completed transaction.

In a further advantageous embodiment, the energy source measures the average dwell time of the portable data carriers carrying out a transaction in order to adapt the predetermined minimal dwell time to the measurement result.

BRIEF DESCRIPTION OF THE DRAWINGS

The invention and further advantageous embodiments will hereinafter be explained more closely with reference to the drawings. The figures show:

FIG. 1 a schematic representation of the components, energy source and energy sink, in an inventive system, FIG. 2 an energy flow chart between system components with different energy sources, FIG. 3 an information flow chart for a charging process between two NFC devices, FIG. 4 a schematic representation of the components of a chip card with a chargeable energy source, FIG. 5 a sectional drawing through an arrangement of a card reader and a chip card with a mechanical positioning aid, FIG. 6 a view of possible user displays to support a relative positioning of 2 units, FIG. 7 a sectional drawing through an arrangement of a card reader and a chip card with an optical positioning aid, and FIG. 8 a signal spectrum of a transmission signal and information on a maximum permissible signal strength.

DETAILED DESCRIPTION

Figure 1:
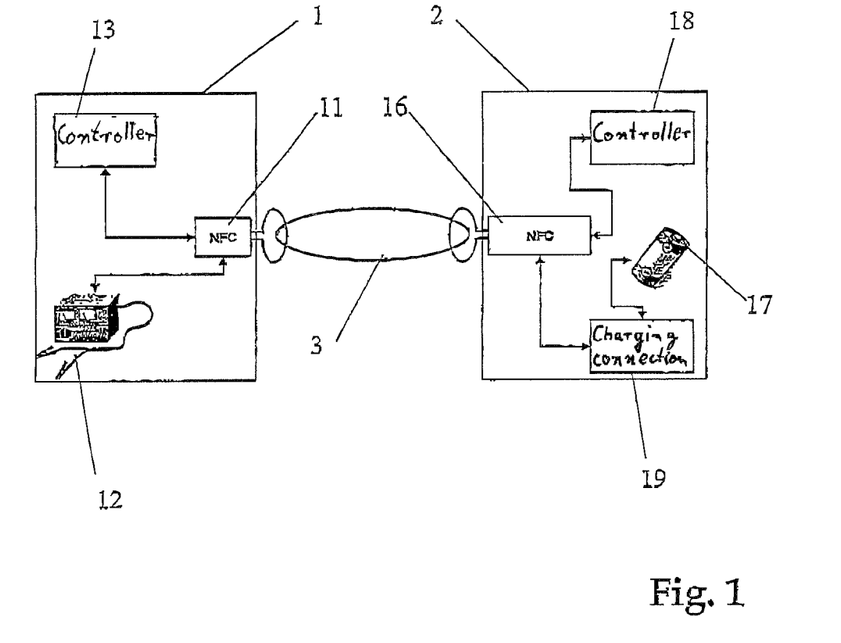

FIG. 1 shows an inventive arrangement with two devices 1, 2 which can communicate contactlessly with each other.

The first device 1 has a contactless interface 11, which is formed for example as an RFID interface or an NFC interface, a controller 13 (e.g. microprocessor with software and memory) and a permanent energy source 12 (accumulator with high capacity or mains voltage supply). The first device 1 can be for example an RFID reading device, an NFC device or a mobile terminal, for example a mobile phone disposed in its charging apparatus.

The second device 2 has a contactless interface 16, which is formed for example as an RFID interface or NFC interface, and a chargeable energy source 17, e.g. an accumulator with a corresponding charging connection 19. The second device 2 used can be a transponder, a dual interface chip card, an NFC device or a mobile terminal. In particular, the contactless interface in a mobile terminal can be formed by a SIM module.

For contactless communication between the first device 1 and the second device 2, the first device 1 produces a high-frequency magnetic alternating field 3 at least temporarily. The energy transmitted to the second device 2 via the magnetic high-frequency alternating field 3 is typically first used for providing the necessary operating energy of the second device. When required and if the transferred energy suffices, at least part of the transferred energy is used for charging the battery 17. It is necessary for successful charging to leave the second device 2 in the range of action of the high-frequency magnetic alternating field 3 for a relatively long time period. A particularly suitable alternating field 3 is a constant field as is emitted e.g. by a reading device, or an NFC device in a "being reader" mode. A field modulation taking place is no problem.

For activating the charging process, different possibilities are provided which will hereinafter be considered more closely.

The second device 2 as the energy sink is located in practice usually only for a short time in the response range of the reading device or NFC device 1 as the energy source. Thus, e.g. devices with an NFC interface are brought within communication range in practice only for carrying out a data transfer and then removed from each other again. Likewise, contactless chip cards are brought within range of an RFID reading device in practice only for a short time.

The second device 2 is brought into the field 3 of a first device 1 and left there for a certain time period. As soon as the second device 2 is located longer than a defined time duration $t_{min}$ in the high-frequency magnetic alternating field 3 with a field strength H sufficient for the charging mode, the charging process is started. The monitoring of the end of the time duration $t_{min}$ and the starting of the charging process can be effected both by the first device 1 and by the second device 2. The time $t_{min}$ can be measured upon entry into the alternating field 3, in particular after a first data interchange between the two devices 1 and 2, or else also only after a completed transaction.

It is avoided in this way that a charging process is initiated for energy sinks that are brought into the effective range of an energy source only unconsciously or are removed from said range consciously after a completed transaction. Fewer charging processes mean less overhead for these processes for the charging device 1. Moreover, there is less downtime for a communication with third parties if this is limited in a charging operational state. Finally, the battery 17 of the second device 2 is also protected from incomplete charging processes which can influence the lifetime of the battery 17.

If these advantages are given up, the time $t_{min}$ can assume the value 0, so that a charging process is started immediately after the second device 2 enters an alternating field 3.

A further aspect of the present invention is described with reference to FIG. 2 and FIG. 3.

In most known systems it is specified a priori that one device performs the function of the energy source (power pack with transmitter) and a second device the function of the energy consumer (handset with chargeable accumulator). With contactless devices, however, such a specification can be lacking. A great variety of devices encounter each other here, such as NFC devices, (dual interface) transponders and reading devices, which have a great variety of energy sources.

Figure 2:
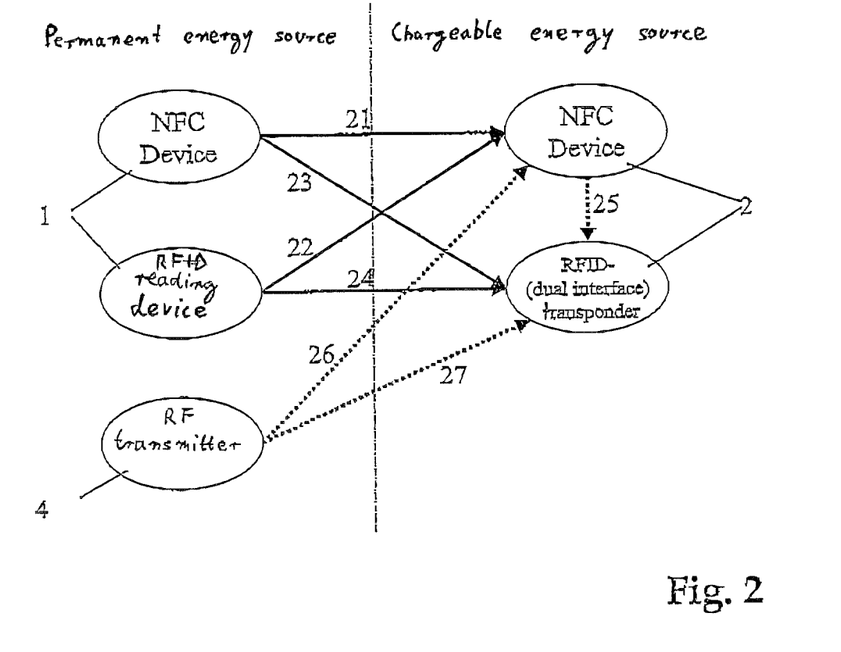

FIG. 2 shows possible combinations of devices for a charging process. Permanent energy sources 1 and 4 as well as chargeable energy sources 2 can act as participants in a charging process 21 to 27. The energy flow and thus the information on which of the devices involved is acting as the energy source or the energy sink is shown by the direction of the arrows 21 to 27. As permanent energy sources 1 and 4 an NFC device 1, an RFID reading device 1 and an RF transmitter 4 are provided which each act only as the energy source. The chargeable energy sources 2, in the form of an NFC device, an RFID transponder or a chip card, can act both as the energy source (charging process 25) and as the energy sink (charging processes 21 to 24 and 26, 27).

In such more complex systems it is unclear without a further information exchange whether a device is able to provide another device with transmitting energy for charging an accumulator, or whether a device is technically able to use the received energy for charging an accumulator. As described more closely hereinafter, information about the abilities of the corresponding device is exchanged and the exchanged information used for determining the role allocation as to which device is acting as the source or the sink.

Figure 3:
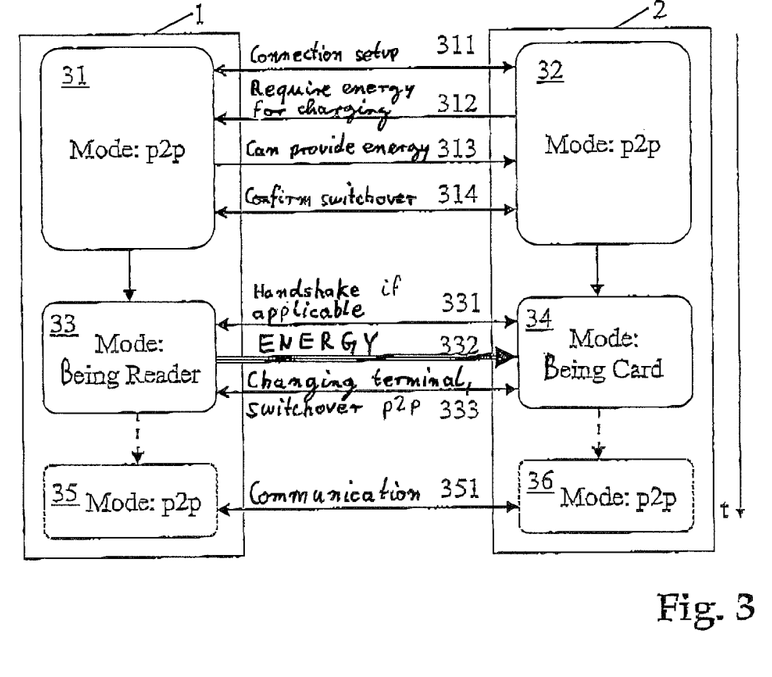

FIG. 3 shows a switchover of the operating mode of the devices 1, 2 for two NFC devices 1 and 2.

With NFC devices a "peer-to-peer" mode is provided in which the devices 1, 2 emit an alternating field 3 in each case only for a short period of time to transfer a data packet to the particular communication partner. However, a charging mode in a second device 2 presupposes a constant alternating field 3, produced by the first device 1.

A connection set-up 311 is effected between the devices 1 and 2 in the p2p mode 31, 32. According to the invention it is provided to exchange information about the power supply to the devices upon a communication 312, 313 between the devices 1 and 2. The data transferred for this purpose can contain information about the type of power supply, e.g. "chargeable energy source" or "mains supply," information about the state of charge of an accumulator, e.g. "require energy for charging," and information about the possibility of providing the constant alternating field 3 for a relatively long time period, e.g. "charging energy can be provided."

Furthermore, it is provided, in particular for NFC devices, to change the operating mode at least for the duration of the charging process for providing the field 3. If a second device 2 with the need to charge and a first device 1 with the possibility of providing the field 3 for a relatively long time period find each other after the exchange of information about the power supply to the devices 1, 2, it is provided to cause a switchover of the operating modes between the two devices 1, 2.

According to the invention, the first device 1 changes from the "peer-to-peer" (p2p) mode 31 to the "being reader" mode 33 and thus produces a constant field 3. The second device 2 changes according to the invention from the p2p mode 32 to the "being card" mode 34. In the "being card" mode 34 the second device 2 uses the field energy provided by the first device 1 at least partly to charge its accumulator.

Optionally, there is first a "handshake" in these operating modes, that is, an initial exchange 331 of data. After a transfer 332 of the energy required for charging, the charging process is completed with a dialog 333 between the devices 1 and 2. The dialog 333 can include declaring a further switchover from the "being card" and "being reader" modes 33, 34 to the p2p mode 35, 36 for the two devices 1 and 2.

As described more closely below with reference to FIG. 6, the first device 1 can moreover switch from a communication mode to an energy transfer mode for the step 332 of energy transfer.

Solutions for initiating and/or terminating charging processes will hereinafter be described likewise with reference to FIGS. 1 and 3.

To ascertain whether the field 3 is still needed, it is provided according to the invention to carry out a handshake or a polling between the devices 1 and 2 at least in cyclic intervals. It is thus recognized whether the second device 2 is still located in the area of the field 3 or whether the second device 2 was already removed.

If the first device 1 does not receive a response to a handshake request or no polling signal is received by the first device 1 for a relatively long time period (time out), it can be assumed that the second device 2 was removed from the field 3 and the field 3 is therefore no longer needed.

It is likewise provided to transfer a status of the charging process between the devices 1 and 2, so that the first device 1 receives information about when the charging process is terminated and the field 3 is no longer needed.

Another problem is a lacking or interrupted power supply to the intelligent second device 2, for example due to a discharged accumulator 17. If the contactless interface 16 of the second device 2 is a dual interface chip card (e.g. in a mobile telephone) or an NFC device, the power supply to the contactless interface 16 is normally effected by the accumulator 17.

If the existing energy of the accumulator 17 is sufficient for supplying the second device 2, it is provided according to the invention that the controller 18 of the second device 2 ascertains whether the accumulator 17 can, or must, be charged. If a field 3 or a first device 1 is present, the charging process can be initiated as described above.

If the existing energy of the accumulator 17 no longer suffices for supplying the second device 2 with energy for operation, however, at least the contactless interface 16 is supplied with the energy taken from the field 3. Furthermore, it is provided to recognize a "battery empty" state by the contactless interface 16 through a corresponding evaluation of internal signals of the first device 2 and to automatically initiate the charging of the accumulator 17.

In a particularly advantageous embodiment, the contactless interface 16 has its own software means for initiating a communication with the first device 1 according to the described sequences, in the "battery empty" state. Such an embodiment can be realized by using a dual interface chip as the contactless interface 16.

To make sure that the operability of the contactless interface 16 is not impaired by the charging current into the energy source 17, it is provided according to the invention to divide up the available energy accordingly for example by means of the charging connection 19.

For initiating the described charging process, various possibilities are provided.

The charging process can be initiated by a manual activation via a user interface. For this purpose it is expedient to display the state of charge of the energy source 17 to the user optically, as is already the case with mobile phones today.

A manual initiation of a charging process is only expedient, however, when a corresponding energy source is available. According to the invention, it is therefore provided to check the availability of an energy source, at least upon activation of a corresponding menu item on the device 2, and, if necessary, output a corresponding message on a display device of the first device 2.

Alternatively, the charging process can also be initiated automatically.

It can thus be expedient with an always chargeable energy source (Li-Ion battery) to fundamentally charge the energy source as soon as a field 3 is available. Some energy sources, however, cannot be charged at any given point in time (e.g. NiCd, NiMH), but only after reaching a certain state of discharge. The automatic initiation of the charging process should therefore be effected in dependence on a type of accumulator 17 to be charged and its state of charge.

Figure 4:
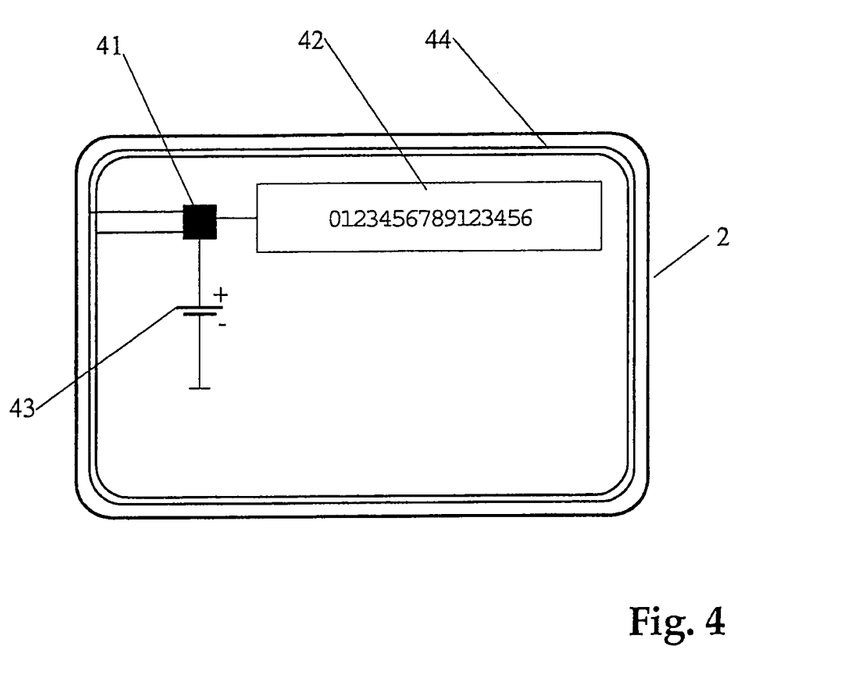

FIG. 4 shows a portable data carrier as the second device 2, which can be used according to the invention both as the energy source and as the energy sink. The portable data carrier 2 comprises a microprocessor 41, a display 42, a chargeable battery 43 and an antenna 44.

Further aspects of the invention that can contribute to an increased efficiency of energy transfer will be explained hereinafter, with reference to FIGS. 5 to 7, among other things.

The communication between the two contactless interfaces is already possible with low magnetic coupling and thus at great distance. Thus, a dual interface chip card according to ISO 14443 can be read out e.g. over a distance of 10 cm. NFC devices can communicate e.g. over a distance of 20 cm. The minimum field strength required for communication can therefore sometimes assume very low values (ISO 14443: responsitivity of a transponder according to the standard: $H_{min}$<1.5 A/m; typical values e.g. 0.75 A/m; ISO 15693: responsitivity of a transponder according to the standard: $H_{min}$<0.15 A/m(!)).

For initiating and efficiently carrying out a charging process, however, high field strengths are desired (ISO 14443: 1.5 . . . 7 A/m is permissible; up to 12 A/m for short times).

To obtain as efficient an energy transfer as possible during the charging process, as good a magnetic coupling as possible is needed between the antennas of the two interfaces. In the ideal case, the antennas are located for this purpose at the smallest possible distance beside each other, so that the antennas form a common axis and come to lie almost on each other. In practice, it is necessary to place two devices 1 and 2 in the right position against or on each other. To make the charging process effective, various possibilities are provided.

There is already a communication relationship between the two devices 1 and 2. The second device 2 has requested a charging process and received a corresponding acknowledgement from the first device 1 that the charging process is being effected. According to the invention, it is now provided to evaluate a magnetic field strength H of the field 3 by the interface 16 of the second device 2 and to signal a resulting efficiency of the charging process to the user.

In particular, it is provided to ask the user of the first device 2 in case of a weak field strength to bring the devices 1 and 2 closer together. For this purpose, e.g. an acoustic or optical indication (display message) is provided on the second device 2.

A further, especially preferred embodiment is to display the field strength H of the field 3 on the interface 16, in the form of an optical "level indicator," so that the user of the devices can optimize the alignment of the devices with each other.

Another embodiment is to display the field strength H of the field 3 on the interface 16, in the form of an acoustic "level indicator," e.g. by a pitch dependent on field strength, so that the user of the devices can optimize the alignment of the devices with each other. For further optimization of the magnetic coupling, a mechanical guide can also be used.

Figure 5:
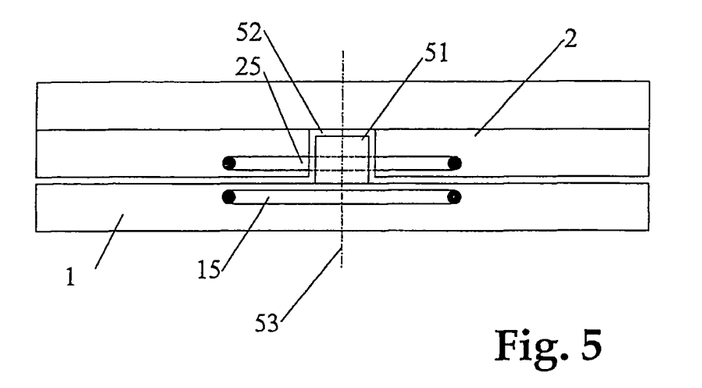

FIG. 5 shows two devices 1 and 2 which are aligned with each other optimally with the help of a mechanical positioning aid.

The first device 1, which can be in particular a card reader, comprises an antenna 15 of its contactless interface and a guide lug 51. The second device 2, which can be in particular a chip card according to FIG. 4, comprises an antenna 25 of its contactless interface and a recess 52 for receiving the guide lug 51.

According to the invention, a mechanical guide or detent is provided such that the antennas 15, 25 of the devices 1, 2 come to lie centrically on each other at the smallest possible distance, possibly having a common center axis 53. Such a mechanical detent can be produced e.g. by the design of the lug 51 and the matching recess 52. The lug 51 and the recess 52 are preferably attached in the center of the antenna coil 15, 25 in each case. The user brings the devices 1, 2 together and aligns them with each other such that the lug 51 locks into the recess 52.

The height of the lug 51, the depth of the recess 52 and their base areas should be so small, in particular if a chip card is used as the second device 2, as is possible for supporting the alignment, so that the chip card is not influenced in its other mechanical properties.

Figure 6:
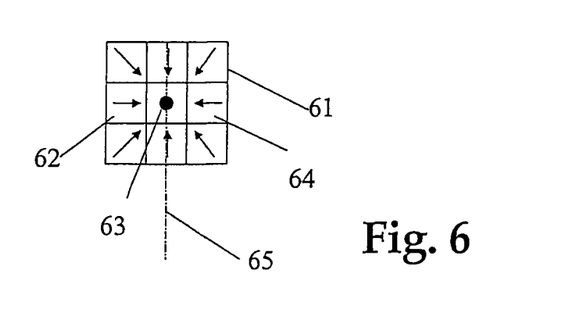
Figure 7:
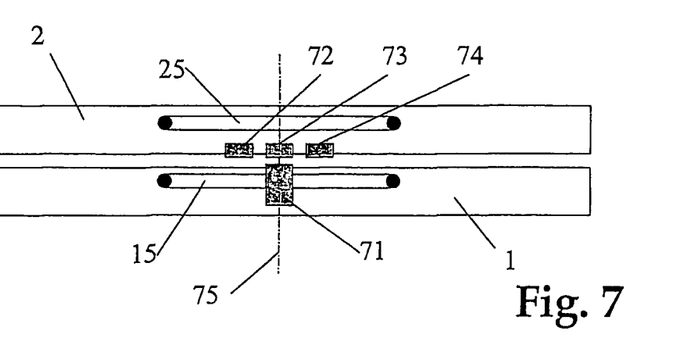

For optimizing the magnetic coupling it is also possible to use an optical positioning aid, as shown for example in FIGS. 6 and 7.

According to the invention, a first device 1 then has an optical transmitter 71 and a second device 2 an optical receiver 73. The optical means are preferably attached in the center of the antenna coil 15, 25 in each case. It is signaled to the user when the optical means 71, 73 are aligned with each other.

Further optical receivers 72, 74 can be so disposed that a slight offset of the devices 1, 2 in the horizontal direction is recognized by the optical receivers 72, 74.

It is displayed to the user in which direction the positioning of the devices 1, 2 must be carried out to achieve an optimal alignment of the coils 15, 25 with each other.

FIG. 6 shows a matrix with 9 elements which corresponds to a possible arrangement of nine optical receivers 62 to 64 in the second device 2 from FIG. 7. The matrix moreover shows optical display possibilities 61 which can be derived from signals of thus disposed optical receivers.

The arrows on the display 61 show the user in which direction the devices 1, 2 must be moved relative to each other to obtain an optimal alignment of the coils 15, with each other. For example, if the second device 2 from FIG. 7 is offset from the first device 1 to the right, the optical receiver 64 receives a signal from the matrix of receivers and a leftward arrow is displayed to the user.

In the embodiments described with reference to FIGS. 5 to 7, either the first device 1 or the second device 2 can be the energy source in an inventive energy transfer. The protruding part of a mechanical positioning aid, or an optical receiver of an optical positioning aid, is preferably disposed on devices with a permanent energy source.

The optical transmitter 71 can be a visually visible light source, e.g. a red LED. It can be off, shine constantly or flash in a predetermined way. The optical transmitter 71 can thus be driven in dependence on the status of a charging process in order to signal said status to a user.

The optical transmitter 71 can also be disposed on devices with a chargeable energy source. It can then shine constantly—for example as an LED—when the device is working as an energy sink, i.e. a charging process for the energy source of the device is being effected. Further, the LED can flash in a first way to indicate the presence of a charger, i.e. a possible charging process, optically to the user. The device could for example come within communication range of the charger by chance and automatically set up a communication relationship, with request and acknowledgement of a possible charging process. The thereupon switched on and flashing LED signals to the user that he can charge his device if he confirms charging and/or simply leaves the device where it is, depending on the implementation variant. The LED can flash in a second way when the device is acting as the energy source for a charging process.

In a particularly advantageous embodiment, the LED is disposed in a chip card as the first or second device such that the LED acts as an optical transmitter according to FIG. 7 on one side of the chip card but is at the same time is recognizable to the user as a signal on the other side of the chip card. It is thus possible to signal to the user, for example, the successful completion of a charging process, for which the LED was constantly on, by switching off the LED if the chip card has a transparent or semitransparent area in the surroundings of the LED. The same result can be achieved by a transparent area in the surroundings of an optical receiver on the chip card if the optical transmitter is disposed on the card reader.

A further possibility is to optically mark the position of an outwardly invisible antenna 15, 25 on the housing of a first device 1, 2. Thus, e.g. a special color marking ("red dot") or a special logo in the area of the antennas 15, 25 can be used for marking. The user brings the devices 1, 2 together and aligns them with each other such that the optical markings are located as close together as possible.

In the hitherto described embodiments, it was assumed at least implicitly that the first device 1 is an intelligent device, i.e. can in particular exchange data bidirectionally and make its operating state dependent on the exchanged data. The following discussion will deal with inventive aspects for a first device 4 from FIG. 2 that is not equipped with intelligent software means, so that it does not have any possibility to set up a bidirectional communication relationship with the second device 2.

In a first embodiment, the non-intelligent device 4 has exclusively a transmitter for producing a continuous high-frequency magnetic alternating field 3. No modulation or automatic switch-off of the field 3 is provided. An intelligent second device 2 which comes into the immediate proximity of a corresponding first device 4 must then initiate the charging process.

In a second embodiment, the non-intelligent device 4 has a transmitter for producing a continuous high-frequency magnetic alternating field 3 and hardware means for producing a hard-coded modulation. The accordingly equipped non-intelligent device 4 emits data at cyclic intervals. Such a datum could be e.g. a defined 7-bit datum as is also used as a request (REQA) or wake-up (WUPA) command by ISO 14443 reading devices. The intelligent second device 2 would thus be able to identify a non-intelligent first device 4 as "non-intelligent device with charging function." Furthermore, the non-intelligent device 4 can be equipped with optical means, as described for FIGS. 6 and 7.

Further, it is provided not to operate the non-intelligent device 4 permanently, but to switch it on only when a transponder or NFC device 2 approaches. The approach of a second device can be detected non-dissipatively. For example, the application WO 03/069538 A2 describes technical possibilities for non-dissipative detection of a transponder in the response range of a reading device. A further possibility is to use mechanical or optical switching apparatuses, which can be triggered e.g. when a device 2 is placed on a specially provided area in the device 4, for example a charging pod.

The non-intelligent device 4 should also be switched off as soon as a device 2 terminates the charging process or leaves the magnetic field 3. Therefore, the amplitude of the magnetic field or the electrical voltage on the transmitting coil of the first device 4 is continuously measured. When a device 2 is taken out of the close range of the field 3, this leads to a measurable fluctuation of the field strength or the electrical voltage on the transmitting coil. The occurrence of such a voltage fluctuation ("dip") can be detected and used as a control signal for switching off the transmitter of the non-intelligent device 4. Likewise, mechanical or optical switching apparatuses can be used that are triggered e.g. when a device 2 is taken out of a specially provided area in the device 4.

Non-intelligent devices 4 will disturb or prevent communication among other intelligent devices 1, 2 in the immediate neighborhood (e.g. within the radius of 0.2 to 1 m) by emitting a continuous magnetic field 3. Therefore, the presence of a continuous magnetic field should be displayed on the second device 2 (e.g. by an indication on a display of the device 2). If an identification datum representing a non-intelligent device is received by the second device 2, the presence of such a first device 4 can also be displayed for the user on the second device 2 (e.g. by an indication on the display of the device 2).

Not every combination of different devices 1, 2 or 4 that permits a communication relationship is actually suitable for carrying out a charging of an accumulator.

In a further, particularly preferred embodiment, it is therefore provided to exchange information about the power supply to the devices fundamentally at each communication set-up between the devices 1, 2. The data transferred for this purpose can contain information about the type of power supply, e.g. "chargeable energy source" or "mains supply," information about the state of charge of an accumulator, e.g. "require energy for charging," and information about the possibility of providing a constant alternating field 3 for a relatively long time period, e.g. "charging energy can be provided."

Further, it is provided to store the received information regarding the power supply on the second device 2, at least for a certain number of past communication relationships between different devices. In particular first devices 1 that can be used as chargers should be stored in a list. Further data that can be stored are e.g. the device name, the serial number (UID) of the contactless interface 11, but also the date and time of the last communication relationship.

Furthermore, it is provided according to the invention to permit the user of the second device 2 to have reading access to this list to thereby be able to find a first device 1 that supports a charging function.

The individual technical aspects sometimes stated for different embodiments can also be combined with each other, as recognizable to the expert. In particular, the hereinafter described switchover of the transmit power, and its embodiments, can also be combined with the hitherto described aspects.

Figure 8:
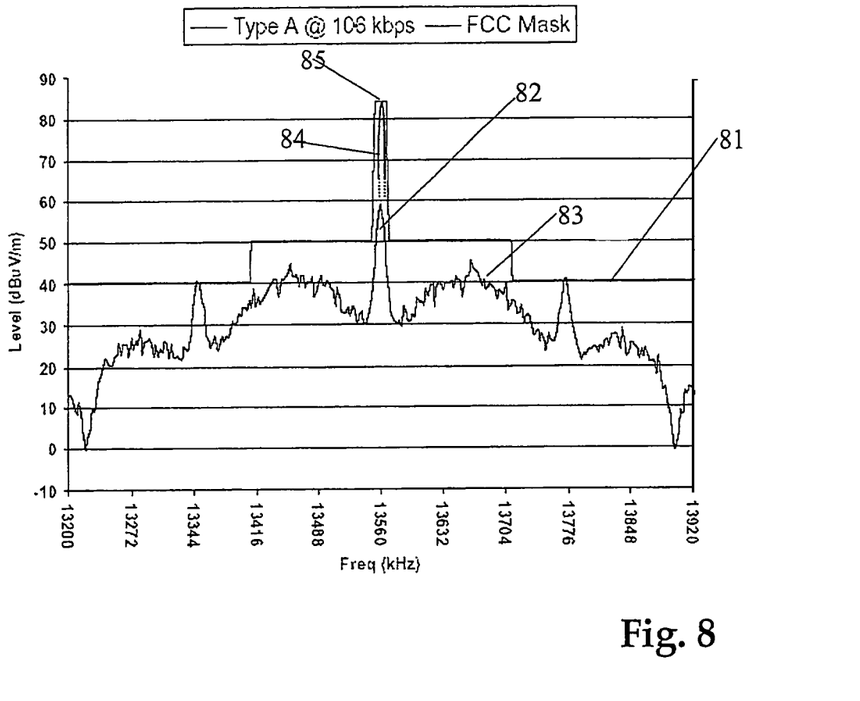

If a carrier signal of an RFID reading device or an NFC device is modulated as the first device 1 to transfer data to a second device 2, the sidebands 83 shown in FIG. 8 arise around the carrier signal 82. Both the carrier signal 82 and the sidebands 83 must keep, with the radiated power, to the limiting values 81 defined for these wavebands. The power radiated by the modulation sidebands 83 has a fixed relation to the transmit power of the carrier signal 82, which results from the modulation depth and the spectrum of the baseband signal (modulation signal). This has the consequence that the transmit power of the carrier signal 82 of the first device 1 must be lowered so far that the modulation sidebands 83 also keep to the limiting values 81. The maximum (magnetic) field strength 85 theoretically possible for the carrier signal 82 is therefore far from being utilizable.

According to the invention, it is therefore provided to stop the data transfer from the charging device 1 to the device 2 to be charged during a charging process at least temporarily, but preferably for as long a time period as possible. Since the first device 1 as the transmitter is thus no longer modulated, i.e. no pronounced sidebands 83 arise, the transmit power of the carrier signal 82 can theoretically be raised as far as the maximum value 85 allowed by the approval regulations. The signal 84 now emitted has a significantly higher field strength, so that a significantly higher power can be taken up on the part of the second device 2 as the receiver. Due to the thereby permitted higher charging current, the charging of an accumulator can be carried out in a considerably shorter time.

In a charging process, the first device 1 as the energy source switches from a combined charging and communication mode to a more efficient charging mode. The combined charging and communication mode can be for example the usual operating mode 33 from FIG. 3. The efficient charging mode can be a combined charging and receiving mode which still permits the first device 1 to receive data that the second device 2 transfers.

For a further optimized charging process, the transmit power of the first device 1 can be formed in a plurality of stages and switched over between said stages according to the particular requirements. In a communication mode, the transmit power is selected so high that bidirectional communication is possible, but so low that energy is not consumed unnecessarily for charging processes that might only possibly occur. While the transmit power for a combined charging and communication mode still allows bidirectional communication, the transmit power in a charging and receiving mode is already so high that sending by the first device 1 is no longer allowed.

To terminate the charging process between energy source and energy sink, interrupt it at least temporarily or continue it in a less efficient mode at least temporarily, different variants are provided according to the invention.

If the energy source, i.e. the first device 1, wants to terminate or interrupt the charging process, the increased transmit power 84 is reduced to the value 82 used in the communication mode. The first device 1 switches back to the communication mode or the combined communication and charging mode. A communication can then be set up with the second device 2 in order to terminate the charging process completely, for example.

If the first device 1, for example by receiving a corresponding signal, recognizes the presence of a third device for which a bidirectional communication would have to be set up, it can temporarily leave the operating mode for more efficient charging. After completion of the bidirectional communication with the third unit, the first device 1 switches back to the more efficient charging mode.

If the second device 2 wants to terminate or interrupt the efficient charging process, the second device 2 will transfer a corresponding request to the first device 1, for example by means of load modulation using the subcarrier. The first device 1 will then reduce the increased transmit power 84 to the value 82 used in the communication mode. Then a communication between the devices 1, 2 can in turn be set up in order to terminate the charging process completely, for example.

A further problem can be that the device 2 to be charged is removed from the magnetic field of the first device 1 during the efficient charging process. If the first device 1 does not recognize this state, it will permanently continue sending with increased transmit power.

To prevent this, the second device 2 will transfer data to the first device 1 at time intervals, for example by means of load modulation. Said data can be a simple polling signal, information about the time interval until the next signal, a unique identification of the device to be charged, or a combination thereof. If this information is no longer received for a certain time period (time out), the sending device will reduce the increased transmit power 84 to the value 82 used in the communication mode again. An attempt can then be made to set up a new communication relationship with the second device 2 if the latter is still located in the response field of the first device 1.

Should the first device 1 be working in a strict charging mode, it can switch to a mode with lower transmit power at corresponding time intervals for a minimal time period in each case to receive or exchange data. In particular, the first device 1 can reduce the transmit power, starting out from the strict charging mode, continuously or only by one of the for example four stages at a time to control a further reduction in dependence on the particular requirements currently recognized.

The invention claimed is:

1. A method for contactless charging of an energy storage unit of an energy sink by an energy source, wherein both carrier signals as well as sidebands of alternating fields must be maintained, with their radiated power, within limiting values defined for these wavebands, comprising the steps:
   providing at least two devices operating in a first operating mode, wherein each of the at least two devices are usable as an energy source or an energy sink in the first operating mode;
   exchanging data in the first operating mode to determine which of the at least two devices acts as the energy source and as the energy sink;
   switching the devices to a second operating mode or a third operating mode;
   transferring data between the energy source and the energy sink via an alternating field in the second operating mode of the energy source, wherein the alternating field comprises a carrier signal and modulation sidebands; and
   transferring energy necessary for charging from the energy source to the energy sink via the alternating field in the third operating mode of the energy source;
   wherein in the third operating mode no data are transferred from the energy source to the energy sink, the alternating field thus does not include pronounced sidebands, and the alternating field is produced with a field strength that is greater than a maximum possible field strength defined by the limiting values upon simultaneous transfer of data and charging energy,
   wherein the energy source changes to the third operating mode only after an end of a predetermined minimal dwell time of the energy sink in the alternating field, and
   wherein the predetermined minimal dwell time of the energy sink staying in the alternating field is measured after an end of a completed transaction between energy source and energy sink.

2. The method according to claim 1, wherein the energy source changes from the third operating mode to the second operating mode to terminate charging.

3. The method according to claim 1, wherein the energy source receives a request to terminate charging from the energy sink in the third operating mode.

4. The method according to claim 1, wherein the energy source changes from the third operating mode to the second operating mode when it no longer receives presence information of the energy sink.

5. The method according to claim 4, wherein the presence information of the energy sink is received at time intervals.

6. The method according to claim 1, wherein the data transfer from the energy sink to the energy source is effected by means of load modulation.

7. The method according to claim 1, wherein the field strength is used as a first field strength for a fast energy transfer in the third operating mode, the maximum possible field strength upon simultaneous transfer of data and charging energy is used as a second field strength for a slow energy transfer in the second operating mode, and a third field strength that is smaller than the first and second field strengths is used for a data transfer in the second operating mode.

8. The method according to claim 1, wherein the energy source changes from the third operating mode to the second operating mode to check in the second operating mode whether charging is to be continued in the third operating mode.

9. The method according to claim 8, wherein charging is continued or not in the third operating mode in dependence on information exchanged in the second operating mode about a state of charge of the energy storage unit of the energy sink.

10. The method according to claim 8, wherein charging is not continued in the third operating mode if the energy source recognizes a further communication partner in the alternating field.

11. The method according to claim 2, wherein charging is terminated or continued in the third operating mode in dependence on information about the state of power supply of the energy source.

12. The method according to claim 1, wherein the predetermined minimal dwell time is adapted to an average transaction time measured in the energy source.

13. The method according to claim 1, wherein the predetermined minimal dwell time is adapted to an average dwell time measured in the energy source.

14. The method according to claim 1, wherein an efficiency of the charging process is signaled to a user of the energy sink.

15. The method according to claim 1, including determining in the step of data transfer that the energy source is to work as the source for energy transfer.

16. The method according to claim 1, wherein the energy sink is a portable data carrier.

17. A system comprising an energy source and an energy sink, including apparatus for carrying out the method according to claim 1 for contactless charging of an energy storage unit of the energy sink by the energy source.

18. An apparatus for contactless charging of an energy storage unit of an energy sink, wherein both carrier signals as well as sidebands of alternating fields must be maintained, with their radiated power, within limiting values defined for these wavebands, comprising:
   an interface unit configured to transfer data between an energy source and the energy sink via an alternating field;
   a controller configured to exchange data in a first operating mode to determine that the apparatus is acting as the energy source and to transfer data between the energy source and the energy sink via the alternating field in a second operating mode of the energy source, wherein the alternating field comprises a carrier signal and modulation sidebands, and to transfer an energy necessary for charging from the energy source to the energy sink via the alternating field in a third operating mode;
   said controller being configured not to transfer any data from the energy source to the energy sink, the alternating field thus does not include pronounced sidebands, and being configured to produce the alternating field with a field strength that is greater than a maximum possible field strength defined by the limiting values upon simultaneous transfer of data and charging energy, in the third operating mode,
   wherein the controller is also configured in a way such that the energy source changes to the third operating mode only after an end of a predetermined minimal dwell time of the energy sink in the alternating field, and wherein the predetermined minimal dwell time of the energy sink staying in the alternating field is measured after an end of a completed transaction between energy source and energy sink.

19. The apparatus according to claim 18, wherein the energy source is configured for contactless charging of the energy sink according to the method of claim 2.

20. The apparatus according to claim 18, wherein the apparatus is a mobile terminal.

21. The apparatus according to claim 18, wherein the apparatus is a portable data carrier.

22. The apparatus according to claim 18, wherein the interface unit is an NFC interface.

23. A portable data carrier adapted for contactless charging of an energy storage unit of a portable data carrier as an energy sink according to the method of claim 1.

* * * * *